United States Patent
Yamada

(10) Patent No.: US 11,022,800 B2
(45) Date of Patent: Jun. 1, 2021

(54) DISPLAY DEVICE

(71) Applicant: SEIKO EPSON CORPORATION, Tokyo (JP)

(72) Inventor: Fumika Yamada, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 325 days.

(21) Appl. No.: 16/142,207

(22) Filed: Sep. 26, 2018

(65) Prior Publication Data

US 2019/0094547 A1    Mar. 28, 2019

(30) Foreign Application Priority Data

Sep. 27, 2017 (JP) .............................. JP2017-185859

(51) Int. Cl.
*G02B 27/01* (2006.01)
*G02B 27/42* (2006.01)

(52) U.S. Cl.
CPC ..... *G02B 27/0172* (2013.01); *G02B 27/4205* (2013.01); *G02B 2027/013* (2013.01); *G02B 2027/0145* (2013.01); *G02B 2027/0174* (2013.01); *G02B 2027/0178* (2013.01)

(58) Field of Classification Search
CPC ............ G02B 27/0172; G02B 27/4205; G02B 2027/0178; G02B 2027/013; G02B 2027/0145; G02B 2027/0174; G02B 2027/0152; G03H 2001/043; G03H 2240/25; G03H 2270/21
USPC .......................................................... 359/14
See application file for complete search history.

(56) References Cited

U.S. PATENT DOCUMENTS

| | | |
|---|---|---|
| 2002/0039232 A1 | 4/2002 | Takeyama |
| 2016/0161755 A1 | 6/2016 | Yonekubo et al. |
| 2016/0202485 A1 | 7/2016 | Yamada |
| 2016/0252742 A1 | 9/2016 | Wakabayashi |
| 2020/0209629 A1* | 7/2020 | Suzuki ............... G02B 27/0172 |

FOREIGN PATENT DOCUMENTS

| | | |
|---|---|---|
| JP | 2002-139695 A | 5/2002 |
| JP | 2016-85428 A | 5/2016 |
| JP | 2016-109923 A | 6/2016 |
| JP | 2016-128861 A | 7/2016 |
| JP | 2016-161669 A | 9/2016 |

* cited by examiner

*Primary Examiner* — William R Alexander
*Assistant Examiner* — Henry A Duong
(74) *Attorney, Agent, or Firm* — Oliff PLC

(57) ABSTRACT

In an optical system of a display device, an image light projecting device emits image light toward a first side in a first direction. A reflective element of a first light-guiding system emits the image light emitted from the image light projecting device toward a second side in the first direction. A first diffraction element having a reflectivity emits the image light emitted from the reflective element toward the first side in the first direction. A second diffraction element having a reflectivity emits the image light emitted from the first diffraction element toward the second side in the first direction and causes the image light to be incident on an eye of an observer. An optical path from the first diffraction element to the second diffraction element is provided in a second light-guiding system.

16 Claims, 12 Drawing Sheets

DISPLAY DEVICE

The present application is based on and claims priority from JP Application Serial Number 2017-185859, filed Sep. 27, 2017, the disclosure of which is hereby incorporated by reference herein in its entirety.

BACKGROUND

1. Technical Field

The disclosure relates to a display device that displays an image using a diffraction element.

2. Related Art

As a display device using a diffraction element such as a holographic element, a display device in which a diffraction element deflects image light emitted from an image light projecting device toward an eye of an observer is conceivable (see JP-A-2016-161669). Interference fringes are optimized in the diffraction element to obtain an optimum diffraction angle and optimum diffraction efficiency at a specific wavelength.

In a display device described in JP-A-2016-161669, image light has a predetermined spectral width with a specific wavelength corresponding to interference fringes in a diffraction element as the center. Thus, light having a wavelength deviated from the specific wavelength may cause a decrease in resolution of an image.

Thus, the inventor of the disclosure studied a display device in which a first reflective diffraction element emits image light emitted from an image light projecting device toward a second diffraction element disposed in the front, and the second diffraction element deflects the image light emitted from the first diffraction element toward an eye of an observer. According to the configuration, the first diffraction element can perform wavelength compensation, and a decrease in resolution of an image due to light having a wavelength deviated from a specific wavelength can be suppressed.

However, in a case of the display device having the above-described configuration, the image light projecting device emits the image light rearward, and thus the image light projecting device is disposed frontward. Thus, in the head-mounted display device, when the image light projecting device, the first diffraction element, and the second diffraction element are installed on a frame mounted on the head of the observer, the image light projecting device having a relatively great mass is disposed frontward. Thus, the center of gravity of the display device is located frontward. As a result, when the display device is mounted on the head, mounting stability of the display device may decrease; for example, the frame is tilted forward.

The disclosure provides a display device capable of disposing an image light projecting device in a position away from a diffraction element to an observer side, the diffraction element being configured to deflect image light toward an eye of an observer.

SUMMARY

One aspect of a display device according to the disclosure includes an image light projecting device configured to project image light, a first light-guiding system including a first reflective element disposed on a first side in a first direction with respect to the image light projecting device, the first light-guiding system being configured to emit the image light projected from the image light projecting device toward a second side in the first direction by the first reflective element, a first diffraction element having a reflectivity, and configured to emit the image light emitted from the first reflective element toward the first side in the first direction, and a second diffraction element having a reflectivity, and configured to emit the image light emitted from the first diffraction element toward the second side in the first direction.

In the disclosure, the first direction may be a front-rear direction of an observer, the first side in the first direction may be a front side in the front-rear direction, the second side in the first direction may be a rear side in the front-rear direction. The display device may further include a frame configured to hold the image light projecting device, the light-guiding system, the first diffraction element, and the second diffraction element. When the frame is mounted on a head of the observer, the second diffraction element may be disposed in front of an eye of the observer.

In the disclosure, the image light projected from the image light projecting device is emitted toward the second side (rear side) in the first direction by the first reflective element of the first light-guiding system, and is then incident on the first diffraction element and emitted from the first diffraction element toward the first side (front side) in the first direction. Then, the image light emitted from the first diffraction element is incident on the second diffraction element and emitted from the second diffraction element toward the second side in the first direction. As a result, the image light is incident on the eye of the observer located on the second side in the first direction with respect to the second diffraction element. Therefore, even when the image light projected from the image light projecting device includes light having a wavelength deviated from a specific wavelength corresponding to interference fringes of the second diffraction element, a difference in diffraction angle at the second diffraction element can be compensated by the first diffraction element. Accordingly, a decrease in resolution of an image can be suppressed. The first reflective element is disposed, and thus the image light projecting device having a great mass can be disposed on the second side in the first direction (rear side: a position away from the diffraction element that deflects the image light toward the eye of the observer to an observer side). Accordingly, when the image light projecting device, the first diffraction element, and the second diffraction element are installed on the frame mounted on the head of the observer, the image light projecting device having a relatively great mass is disposed rearward. Thus, the center of gravity of the display device is located rearward. Thus, when the display device is mounted on the head, mounting stability of the display device can be enhanced; for example, the frame is less likely to be tilted forward.

In the disclosure, the image light projecting device may project the image light toward the first side in the first direction. Therefore, the image light projected from the image light projecting device can be caused to be incident on the first reflective element without a reflective member located closer to the second side in the first direction than the image light projecting device.

In the disclosure, the second diffraction element may be disposed closer to a first side in a second direction intersecting the first direction than the first diffraction element, and a second light-guiding system configured to guide the image light emitted from the first diffraction element toward the second diffraction element may be provided in an optical path from the first diffraction element to the second diffraction element.

In the disclosure, the second light-guiding system may include a lens system configured to allow the image light emitted from the first diffraction element to be incident on, and a reflective member configured to emit, toward the first side in the second direction, the image light emitted from the lens system to the first side in the first direction. Therefore, even when a projection lens and the like are used in the image light projecting device, the lens system of the second light-guiding system can correct an aberration caused by the projection lens and the like.

In the disclosure, the image light projecting device may be disposed closer to the second side in the first direction than the first diffraction element. Therefore, the image light projecting device having a relatively great mass is disposed toward the rear, and thus the center of gravity of the display device is located rearward. Thus, when the display device is mounted on the head, mounting stability of the display device can be enhanced; for example, the frame is less likely to be tilted forward.

In the disclosure, a reflection surface of the first reflective element may be a recessed curved surface being recessed in a central portion with respect to a peripheral portion. Therefore, the first reflective element has a function of condensing light, and thus the image light projected from the image light projecting device can be efficiently caused to be incident on the first diffraction element.

In the disclosure, the first light-guiding system may include a second reflective element configured to direct the image light emitted from the image light projecting device toward the first reflective element. Therefore, the optical path from the image light projecting device to the first reflective element can be suitable for the head-mounted display device.

In the disclosure, a reflection surface of the second reflective element may be a recessed curved surface being recessed in a central portion with respect to a peripheral portion. Therefore, the second reflective element has a function of condensing light, and thus the image light projected from the image light projecting device can be efficiently caused to be incident on the first reflective element.

In the disclosure, the first diffraction element and the first reflective element may be fixed to any of a plurality of surfaces of a light transmissive light-guiding member. Therefore, the first diffraction element and the first reflective element can be efficiently installed on the frame.

In the disclosure, each of an incident surface of the first diffraction element and an incident surface of the second diffraction element may be a recessed curved surface being recessed in a central portion with respect to a peripheral portion. Therefore, the first diffraction element and the second diffraction element have a function of condensing light, and thus the function of condensing the image light toward the eye of the observer is enhanced. Therefore, a high-quality image having a great angle of view can be displayed.

In the disclosure, each of the first diffraction element and the second diffraction element may be a reflective volume holographic element. Therefore, a wavelength forming the image light can be selectively diffracted, and thus high permeability can be obtained. Therefore, external light (background) and an image can be visually recognized in the display device.

In the disclosure, the image light projecting device may include an image light generating device configured to generate the image light and a projection optical system configured to project the image light generated by the image light generating device.

In this case, the image light generating device may include an organic electroluminescent display element. Therefore, a small-sized display device capable of displaying a high-quality image can be provided.

In the disclosure, the image light generating device may also adopt such an aspect as to include an illumination light source and a liquid crystal display element that modulates illumination light emitted from the illumination light source. Therefore, the illumination light source can be selected, and thus there is an advantage of increasing a degree of flexibility in a wavelength characteristic of the image light.

BRIEF DESCRIPTION OF THE DRAWINGS

Embodiments of the disclosure will be described with reference to the accompanying drawings, wherein like numbers reference like elements.

DESCRIPTION OF EXEMPLARY EMBODIMENTS

Exemplary embodiments of the disclosure will be described below with reference to the accompanying drawings. Note that, in each of the drawings below, to make each of layers and each of members a recognizable size, each of the layers and each of the members are illustrated to be different from an actual scale and an actual angle.

Exemplary Embodiment 1

General Arrangement

Figure 1:
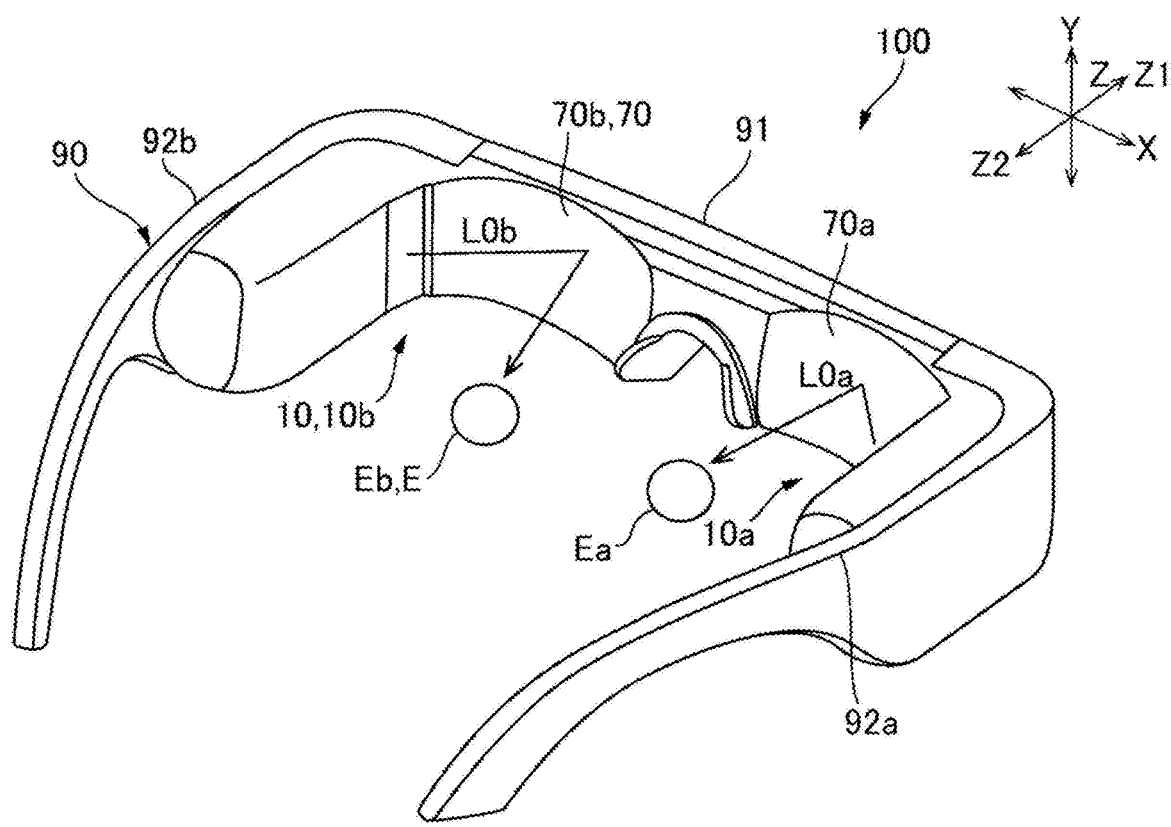
FIG. 1 is an external view illustrating one aspect of an external appearance of a display device according to Exemplary Embodiment 1 of the disclosure.
Figure 2:
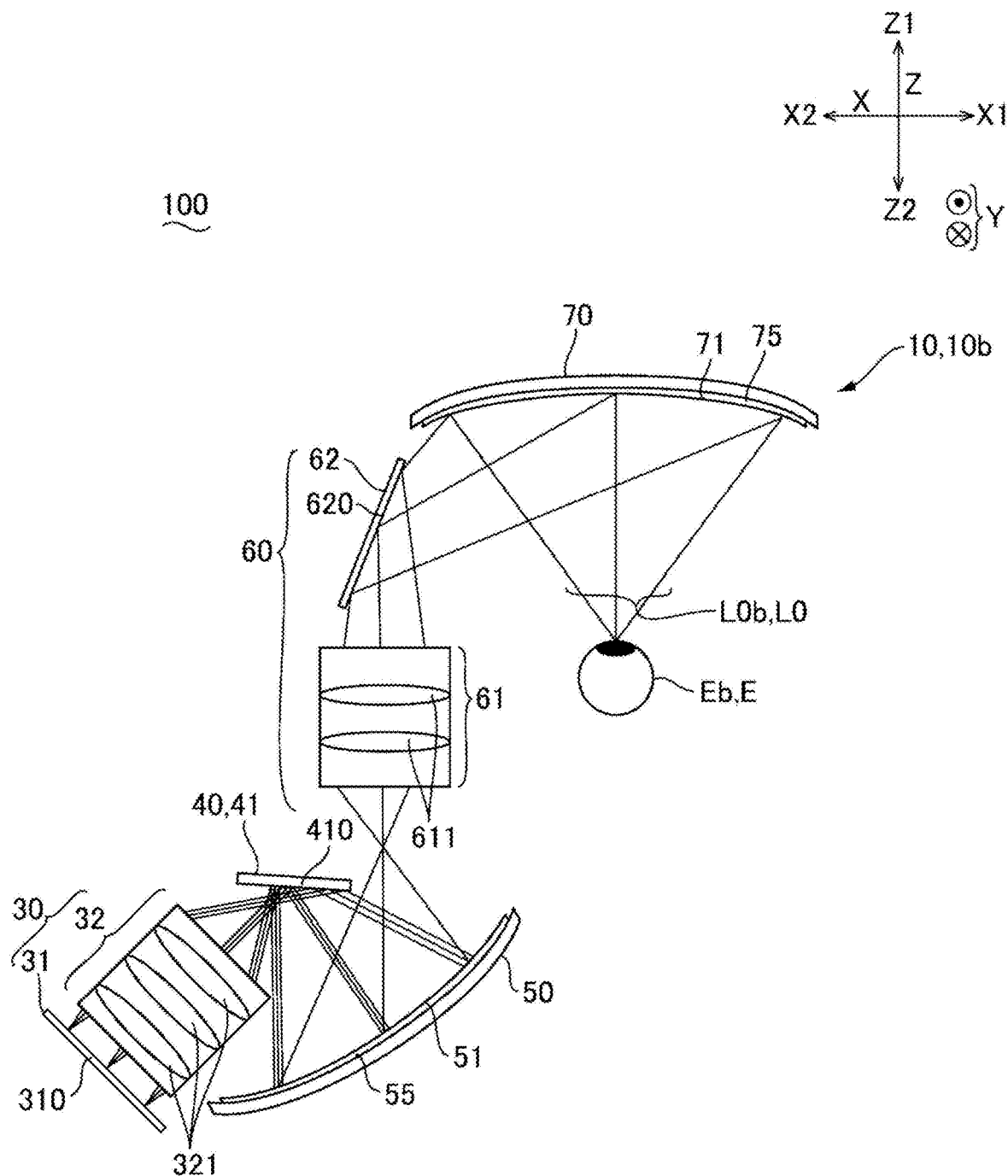
FIG. 2 is a schematic diagram illustrating one aspect of an optical system of the display device illustrated in FIG. 1.

FIG. 1 is an external view illustrating one aspect of an external appearance of a display device 100 according to Exemplary Embodiment 1 of the disclosure. FIG. 2 is a schematic diagram illustrating one aspect of an optical system 10 of the display device 100 illustrated in FIG. 1. Note that, in FIGS. 1 and 2, it is assumed that an anteroposterior direction is a first direction Z. A front side is a first side Z1 in the first direction Z. A rear side is a second side Z2 in the first direction Z. A horizontal direction is a second direction X. A vertical direction is a third direction Y. Also in FIG. 2 illustrating a left-eye optical system 10*b*, it is assumed that a right side (nose side) is a first side X1 in the second direction X, and a left side (ear side) is a second side X2 in the second direction X.

The display device 100 illustrated in FIG. 1 is a head-mounted display device, and includes a right-eye optical system 10*a* that causes image light L0*a* to be incident on a right eye Ea and the left-eye optical system 10*b* that causes image light L0*b* to be incident on a left eye Eb. For example, the display device 100 is formed in a shape like glasses. Specifically, the display device 100 includes a frame 90 that holds the right-eye optical system 10*a* and the left-eye optical system 10*b*. The frame 90 is mounted on the head of an observer. The frame 90 has a front portion 91 that holds a second diffraction element 70*a* of the right-eye optical system 10*a* and a second diffraction element 70*b* of the left-eye optical system 10*b*, which are described later. A temple 92*a* on the right side of the frame 90 and a temple 92*b* on the left side respectively hold an image light projecting device of the right-eye optical system 10*a* and an image light projecting device of the left-eye optical system 10*b*, which are described later.

The right-eye optical system 10*a* and the left-eye optical system 10*b* have the same basic configuration. Therefore, the right-eye optical system 10*a* and the left-eye optical system 10*b* will be described as the optical system 10 without distinction in the description below. FIG. 2 illustrates only the left-eye optical system 10*b* as the optical system 10, and description of the right-eye optical system 10*a* will be omitted. FIG. 2 also includes beams of light at an angle of view at the center and both ends of image light. However, only a central beam of light at each angle of view of beams of light after the first diffraction element 50 is illustrated while the other beams of light are omitted to simplify the drawing.

As illustrated in FIG. 2, a first light-guiding system 40 including a reflective element 41 (first reflective element), the first diffraction element 50 having reflectivity, and the second diffraction element 70 having reflectivity are disposed along a traveling direction of the image light L0 emitted from an image light projecting device 30 in the optical system 10. The image light projecting device 30 emits the image light L0 toward the first side Z1 in the first direction Z when the traveling direction of the image light L0 in the first direction Z in the optical system 10 is focused on. The image light L0 emitted from the image light projecting device 30 is incident on the reflective element 41 of the first light-guiding system 40 from the second side Z2 in the first direction Z. The reflective element 41 emits the incident image light L0 toward the second side Z2 in the first direction Z. The image light L0 emitted from the reflective element 41 is incident on the first diffraction element 50 from the first side Z1 in the first direction Z. The first diffraction element 50 emits the incident image light L0 toward the first side Z1 in the first direction Z. The image light L0 emitted from the first diffraction element 50 is incident on the second diffraction element 70 from the second side Z2 in the first direction Z. The second diffraction element 70 emits the incident image light L0 toward the second side Z2 in the first direction Z. The image light L0 emitted from the second diffraction element 70 is incident on an eye E of the observer.

In Exemplary Embodiment 1, a second light-guiding system 60 is disposed in the optical path from the first diffraction element 50 to the second diffraction element 70. Therefore, the image light L0 emitted from the first diffraction element 50 toward the first side Z1 in the first direction Z is incident on the second diffraction element 70 via the second light-guiding system 60.

Detailed Configuration of Optical System 10

In Exemplary Embodiment 1, the image light projecting device 30 includes an image light generating device 31 that generates the image light L0 and a projection optical system 32 that projects the image light L0 generated by the image light generating device 31 toward the first side Z1 in the first direction Z. In Exemplary Embodiment 1, each of the image light generating device 31 and the projection optical system 32 emits the image light L0 from a direction inclined obliquely from the first side Z1 in the first direction Z toward the first side X1 in the second direction X.

The projection optical system 32 includes a plurality of lenses 321. The image light generating device 31 can adopt such an aspect as to include a display panel 310 such as an organic electroluminescent display element. The aspect can provide a small-sized display device 100 capable of displaying a high-quality image. The image light generating device 31 may also adopt such an aspect as to include an illumination light source (not illustrated) and a display panel 310 such as a liquid crystal display element that modulates illumination light emitted from the illumination light source. The aspect allows the illumination light source to be selected. Thus, the aspect has an advantage of increasing a degree of flexibility in a wavelength characteristic of the image light L0. Herein, the image light generating device 31 can adopt such an aspect as to include one display panel 310 that enables color display. The image light generating device 31 may also adopt such an aspect as to include a plurality of display panels 310 corresponding to respective colors and a synthesis optical system that synthesizes image light in respective colors emitted from the plurality of display panels 310. Furthermore, the image light projecting device 30 may adopt such an aspect to modulate laser light with a micromirror device.

The first light-guiding system 40 includes the reflective element 41 (first reflective element) disposed on the first side Z1 in the first direction Z with respect to the image light projecting device 30. In Exemplary Embodiment 1, the first light-guiding system 40 includes only the reflective element 41. The reflective element 41 is disposed such that a reflection surface 410 faces the second side Z2 in the first direction Z, and emits the image light L0 projected from the image light projecting device 30 to the second side Z2 in the first direction Z. In Exemplary Embodiment 1, the reflective element 41 emits the image light L0 projected from the image light projecting device 30 to a direction inclined obliquely from the second side Z2 in the first direction Z toward the first side X1 in the second direction X.

The first diffraction element 50 is a reflective diffraction element, and emits the image light L0 emitted from the reflective element 41 toward the first side Z1 in the first direction Z. In Exemplary Embodiment 1, the first diffraction element 50 is disposed on the second side Z2 in the first direction Z in a position away from the reflective element 41 such that an incident surface 51 faces in a direction inclined obliquely from the first side Z1 in the first direction Z toward the second side X2 in the second direction X. Therefore, the first diffraction element 50 emits, toward the first side Z1 in the first direction Z, the image light L0 incident from the direction inclined obliquely from the first side Z1 in the first direction Z toward the second side X2 in the second direction X.

The second diffraction element 70 is disposed in a position having the center deviated from a position on the first side Z1 in the first direction Z facing the first diffraction element 50 to the first side X1 in the second direction X such that an incident surface 71 faces the second side Z2 in the first direction Z. The second light-guiding system 60 includes a lens system 61 on which the image light L0 emitted from the first diffraction element 50 is incident and a reflective member 62 that emits, to the direction inclined obliquely from the first side Z1 in the first direction Z toward the first side X1 in the second direction X, the image light L0 emitted from the lens system 61 toward the first side Z1 in the first direction Z. The lens system 61 includes a plurality of lenses 611 disposed from the second side Z2 toward the first side Z1 in the first direction Z. The reflective member 62 includes a reflection surface 620 inclined obliquely toward the second side Z2 in the first direction Z with respect to the first side X1 in the second direction X. In Exemplary Embodiment 1, in the lens system 61, an intermediate image is not formed.

Detailed Configuration of First Diffraction Element 50 and Second Diffraction Element 70

Figure 3:
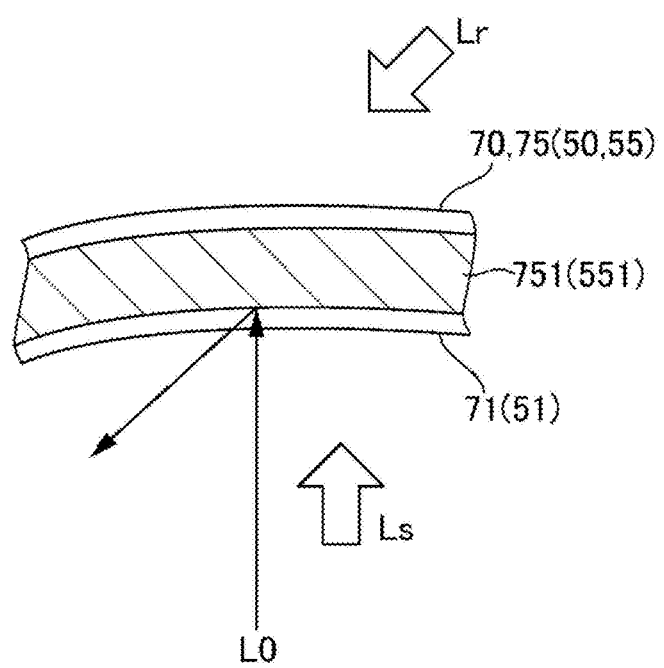
FIG. 3 is a schematic diagram of interference fringes of a second diffraction element illustrated in FIG. 2.

FIG. 3 is a schematic diagram of interference fringes 751 of the second diffraction element 70 illustrated in FIG. 2. In FIG. 2, the second diffraction element 70 includes a reflective volume holographic element 75, which is a partial reflective diffraction optical element. Thus, the second diffraction element 70 constitutes a partial transmission reflective combiner. Therefore, external light is also incident on the eye E via the second diffraction element 70, and thus the observer can recognize an image in which the image light L0 formed by the image light generating device 31 and the external light (background) are superimposed on each other.

The second diffraction element 70 faces the eye E of the observer. The incident surface 71 of the second diffraction element 70 on which the image light L0 is incident has a recessed curved surface being recessed in a direction away from the eye E. In other words, the incident surface 71 has a shape having a central portion recessed and curved with respect to a peripheral portion in the incident direction of the image light L0. Thus, the image light L0 can be efficiently condensed toward the eye E of the observer.

The first diffraction element 50 includes a reflective volume holographic element 55, which is a partial reflective diffraction optical element. The incident surface 51, of the first diffraction element 50, on which the image light L0 is incident has a recessed curved surface being recessed. In other words, the incident surface 51 has a shape having a central portion recessed and curved with respect to a peripheral portion in the incident direction of the image light L0. Thus, the image light L0 can be efficiently deflected toward the second light-guiding system 60. The first diffraction element 50 forms an intermediate image of the image light L0 once.

As illustrated in FIG. 3, the second diffraction element 70 includes interference fringes 751 having a pitch corresponding to a specific wavelength. The interference fringes 751 are recorded as a difference of a refractive index and the like in a hologram photosensitive layer. The interference fringes 751 are inclined in one direction with respect to the incident surface 71 of the second diffraction element 70 to correspond to a specific incident angle. Therefore, the second diffraction element 70 diffracts and then deflects the image light L0 in a predetermined direction. The specific wavelength and the specific incident angle respectively correspond to a wavelength and an incident angle of the image light L0. The interference fringes 751 having the above configuration can be formed by performing interference exposure on a holographic photosensitive layer by using reference light Lr and object light Ls.

Note that the first diffraction element 50 and the second diffraction element 70 have the same basic configuration. Thus, reference numerals of the first diffraction element 50, such as interference fringes 551 of the first diffraction element 50, are indicated in parentheses in FIG. 3, and description of the reference numerals will be omitted.

Wavelength Compensation

Figure 4:
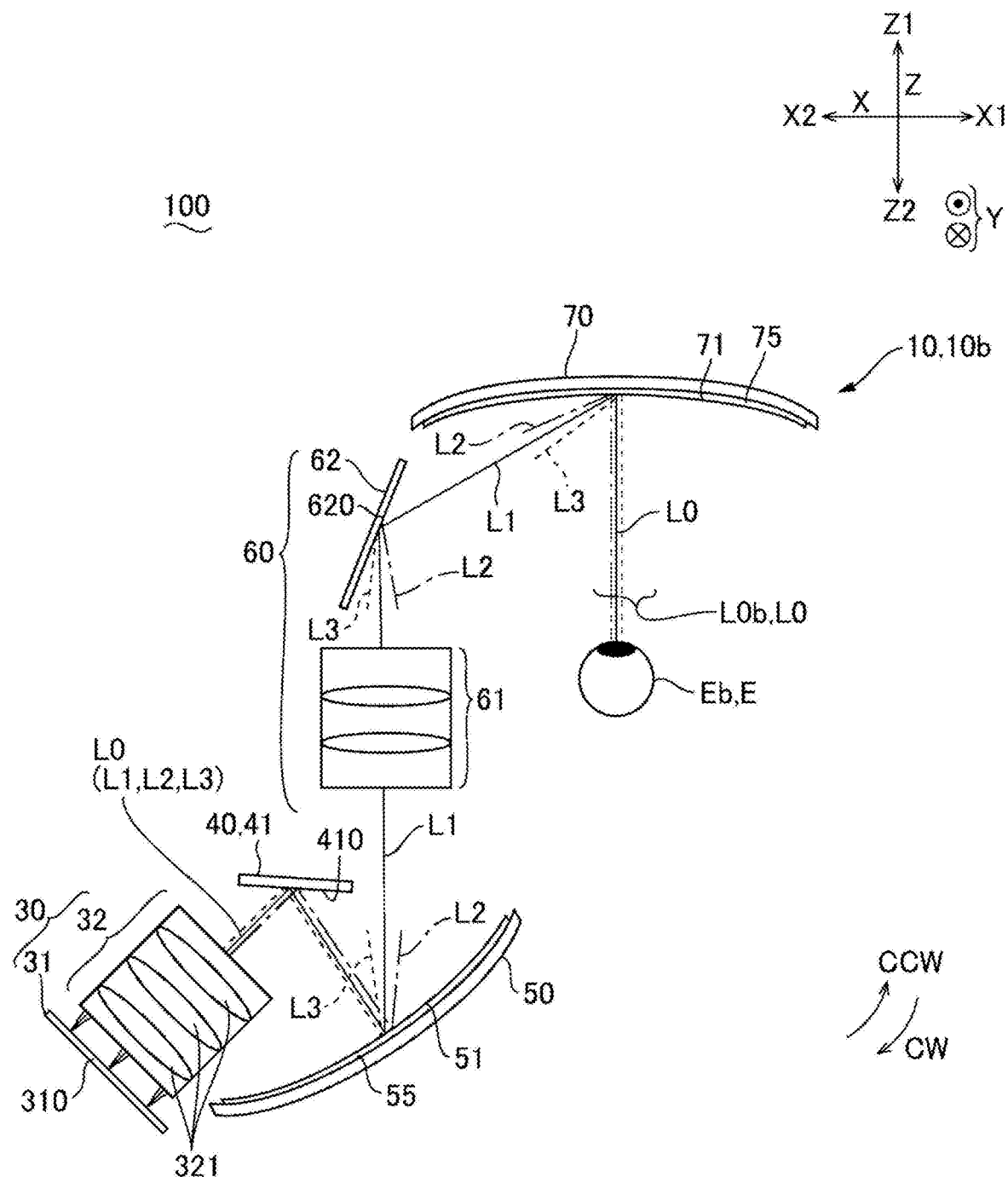
FIG. 4 is a schematic diagram of wavelength compensation in a first diffraction element and the second diffraction element illustrated in FIG. 2.

FIG. 4 is a schematic diagram of wavelength compensation in the first diffraction element 50 and the second diffraction element 70 illustrated in FIG. 2. Note that FIG. 4 illustrates only wavelength compensation in the beam of light at the center of the angle of view, but the same wavelength compensation is also performed on the other beams of light at the angle of view. FIG. 4 illustrates light L1 (solid line) having the specific wavelength of the image light L0. For example, it is assumed that the light L1 is light having a wavelength at an intensity peak of the image light L0. FIG. 4 also illustrates light L2 (dot-and-dash line) on a long wavelength side with respect to the specific wavelength and light L3 (dotted line) on a short wavelength side with respect to the specific wavelength.

In FIG. 4, the image light L0 incident on the first diffraction element 50 is diffracted and deflected by the first diffraction element 50. At this time, the light L2 on the long wavelength side with respect to the specific wavelength has a diffraction angle greater than a diffraction angle of the light L1 having the specific wavelength. Further, the light L3 on the short wavelength side with respect to the specific wavelength has a diffraction angle smaller than a diffraction angle of the light L1 having the specific wavelength. Therefore, the image light L0 emitted from the first diffraction element 50 is deflected and dispersed at each wavelength.

The image light L0 emitted from the first diffraction element 50 is incident on the second diffraction element 70 via the second light-guiding system 60 and is then diffracted and deflected by the second diffraction element 70. At this time, in the optical path from the first diffraction element 50 to the second diffraction element 70, the first diffraction element 50 forms an intermediate image once, and the reflective member 62 reflects the image light L0 once. Therefore, assuming that an angle between the image light L0 and a normal line of the incident surface of the second diffraction element 70 is an incident angle, the light L2 on the long wavelength side with respect to the specific wavelength has an incident angle greater than an incident angle of the light L1 having the specific wavelength, while the light L3 on the short wavelength side with respect to the specific wavelength has an incident angle smaller than the incident angle of the light L1 having the specific wavelength. Further, the light L2 on the long wavelength side with respect to the specific wavelength has a diffraction angle greater than a diffraction angle of the light L1 having the specific wavelength, while the light L3 on the short wavelength side with respect to the specific wavelength has a diffraction angle smaller than the diffraction angle of the light L1 having the specific wavelength.

Therefore, the light L2 on the long wavelength side with respect to the specific wavelength is incident on the first diffraction element 50 at the incident angle greater than the incident angle of the light L1 having the specific wavelength. However, the light L2 on the long wavelength side with respect to the specific wavelength has the diffraction angle greater than the diffraction angle of the light L1 having the specific wavelength. Thus, as a result, the light L2 on the long wavelength side with respect to the specific wavelength and the light L1 having the specific wavelength are substantially parallel light when emitted from the second diffraction element 70. In contrast, the light L3 on the short wavelength side with respect to the specific wavelength is incident on the first diffraction element 50 at the incident angle smaller than the incident angle of the light L1 having the specific wavelength. However, the light L3 on the short wavelength side with respect to the specific wavelength has the diffraction angle smaller than the diffraction angle of the light L1 having the specific wavelength. Thus, as a result, the light L3 on the short wavelength side with respect to the specific wavelength and the light L1 having the specific wavelength are substantially parallel light when emitted from the second diffraction element 70. Accordingly, since the image light L0 emitted from the second diffraction element 70 is incident as the substantially parallel light on the eye E of the observer, misalignment of image formation in a retina at each wavelength can be suppressed.

Herein, the first diffraction element 50 and the second diffraction element 70 are desirably formed to cancel out a difference in diffraction angle due to wavelengths. For example, a difference in diffraction angle due to wavelengths can be canceled out by forming the first diffraction element 50 and the second diffraction element 70 such that the interference fringes 551 and 751 illustrated in FIG. 3 are equal in pitch and inclination in an in-plane direction. However, adopting an aspect in which the interference fringes 551 and 751 are different in pitch and inclination in the in-plane direction may be desirable in consideration of an influence of an optical part disposed between the first diffraction element 50 and the second diffraction element 70. In this case, the interference fringes 551 and 751 may have different pitches or inclinations in consideration of the influence of the optical part in order to condense the image light L0 emitted from the second diffraction element 70. In either case, the image light L0 incident on the first diffraction element 50 is adjusted to a beam in a parallel state having an angle according to a position generated by passing through the projection optical system 32. Thus, the interference fringes 551 can have a suitable pitch and a suitable inclination such that the first diffraction element 50 and the second diffraction element 70 cancel out a difference in diffraction angle due to the respective wavelengths according to a position in the in-plane direction of the first diffraction element 50.

Specific Example of Configuration of First Diffraction Element 50 and Second Diffraction Element 70

Figure 5:
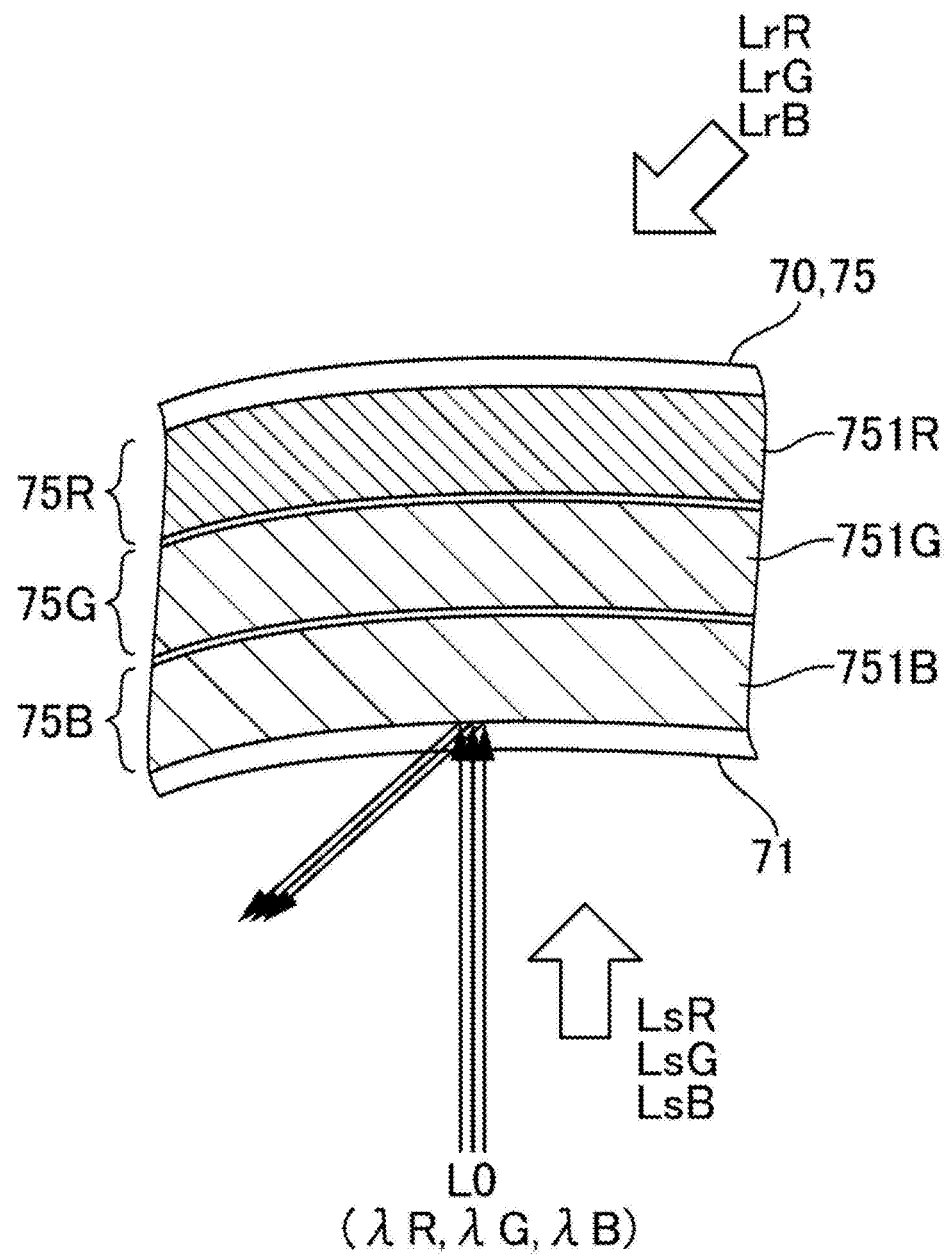
FIG. 5 is a cross-sectional diagram illustrating a specific example 1 of a configuration of the second diffraction element illustrated in FIG. 2.
Figure 6:
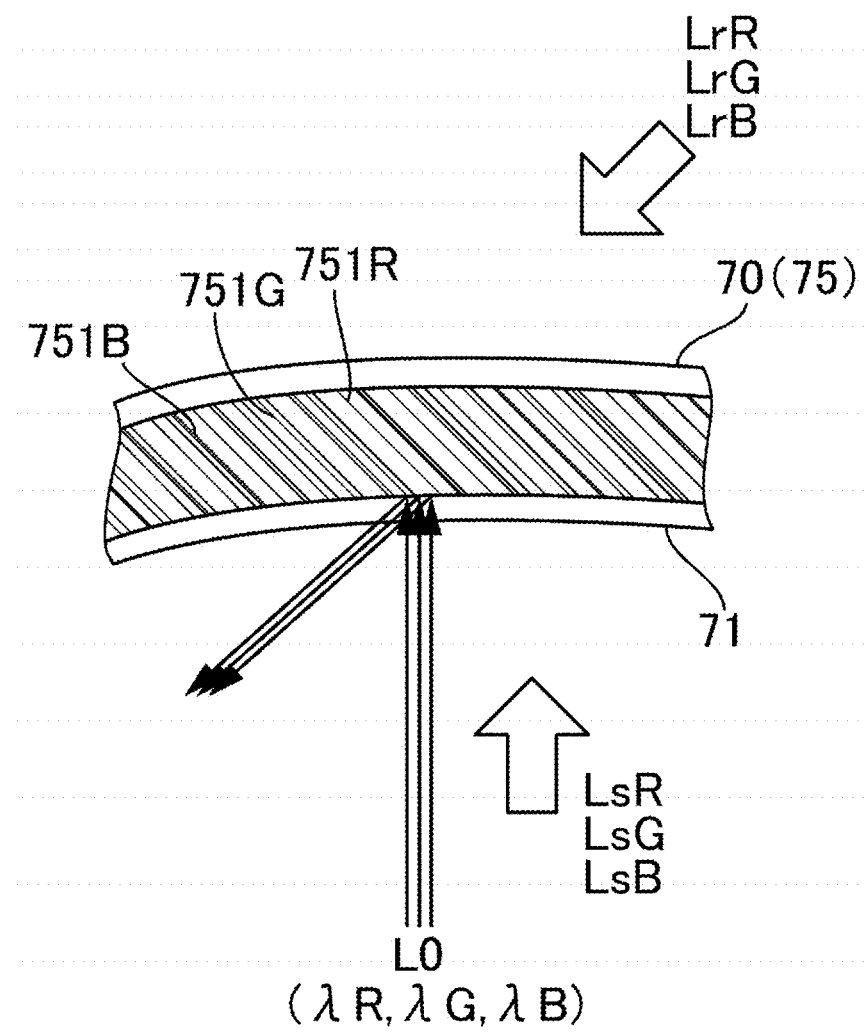
FIG. 6 is a cross-sectional diagram illustrating a specific example 2 of a configuration of the second diffraction element illustrated in FIG. 2.

FIG. 5 is a cross-sectional diagram illustrating a specific example 1 of a configuration of the second diffraction element 70 illustrated in FIG. 2. FIG. 6 is a cross-sectional diagram illustrating a specific example 2 of a configuration of the second diffraction element 70 illustrated in FIG. 2. When the image light L0 is used for color display in the display device illustrated in FIGS. 1 and 2, the first diffraction element 50 and the second diffraction element 70 are configured as illustrated in FIG. 5 or 6. Note that FIGS. 5 and 6 illustrate only the second diffraction element 70, and the first diffraction element 50 is omitted from the diagrams.

In the example of the configuration illustrated in FIG. 5, in the second diffraction element 70, reflective volume holographic elements 75R, 75G, and 75B are laminated, and interference fringes 751R, 751G, and 751B are respectively formed in the reflective volume holographic elements 75R, 75G, and 75B at a pitch corresponding to a specific wavelength. For example, the interference fringes 751R are formed at a pitch corresponding to a wavelength of 615 nm, for example, in a wavelength range from 580 nm to 700 nm. The interference fringes 751G are formed at a pitch corresponding to a wavelength of 535 nm, for example, in a wavelength range from 500 nm to 580 nm. The interference fringes 751B are formed at a pitch corresponding to a wavelength of 460 nm, for example, in a wavelength range from 400 nm to 500 nm. The configuration can be formed by performing interference exposure on the holographic photosensitive layer by using reference light LrR, LrG, and LrB and object light LsR, LsG, and LsB having the respective wavelengths, while a holographic photosensitive layer having sensitivity corresponding to the respective wavelengths is formed.

Further, as illustrated in FIG. 6, the interference fringes 751R, 751G, and 751B may be formed in one layer by dispersing a photosensitive material having sensitivity corresponding to the respective wavelengths in the holographic photosensitive layer and then performing interference exposure on the holographic photosensitive layer by using the reference light LrR, LrG, and LrB and the object light LsR, LsG, and LsB having the respective wavelengths. In the both examples of the configuration illustrated in FIGS. 5 and 6, light having a spherical wave may be used as the reference light LrR, LrG, and LrB and the object light LsR, LsG, and LsB.

Effects of Exemplary Embodiment 1

As described above, in the display device 100 in Exemplary Embodiment 1, the image light L0 projected from the image light projecting device 30 is emitted toward the second side Z2 (rear side) in the first direction Z by the reflective element 41 (first reflective element) of the first light-guiding system 40, and is then incident on the first diffraction element 50. The image light L0 is emitted from the first diffraction element 50 toward the first side Z1 (front side) in the first direction Z, and is then incident on the second diffraction element 70. Therefore, even when the image light L0 projected from the image light projecting device 30 includes light having a wavelength deviated from the specific wavelength corresponding to the interference fringes of the second diffraction element 70, a difference in diffraction angle at the second diffraction element 70 can be compensated by the first diffraction element 50. Accordingly, a decrease in resolution of an image can be suppressed.

The reflective element 41 is disposed on the first side Z1 in the first direction Z with respect to the image light projecting device 30, and thus the image light projecting device 30 having a great mass can be disposed on the second side Z2 in the first direction Z. In Exemplary Embodiment 1, an end portion of the image light projecting device 30 on the second side Z2 in the first direction Z is located closer to the second side Z2 in the first direction Z than the first diffraction element 50. Accordingly, when the image light projecting device 30, the first diffraction element 50, and the second diffraction element 70 are installed on the frame 90 to be mounted on the head of the observer, the image light projecting device 30 having a relatively great mass is disposed on the second side Z2 in the first direction Z (rearward, a position away from the second diffraction element 70 that deflects the image light L0 toward the eye E of the observer to an observer side). Thus, the center of gravity of the display device 100 is located rearward. Thus, when the display device 100 is mounted on the head, mounting stability of the display device 100 can be enhanced; for example, the frame 90 is less likely to be tilted forward.

The image light projecting device 30 projects the image light L0 toward the first side Z1 in the first direction Z. Thus, the image light L0 projected from the image light projecting device 30 can be caused to be incident on the reflective element 41 without the provision of a reflective member located on the second side Z2 in the first direction Z with respect to the image light projecting device 30.

The second diffraction element 70 is disposed on the first side X1 in the second direction X with respect to the first diffraction element 50, and the optical path from the first diffraction element 50 to the second diffraction element 70 includes the second light-guiding system 60 including the lens system 61. Thus, even when a projection lens and the like are used in the image light projecting device 30, the lens system 61 of the second light-guiding system 60 can correct an aberration caused by the projection lens and the like.

Exemplary Embodiment 2

Figure 7:
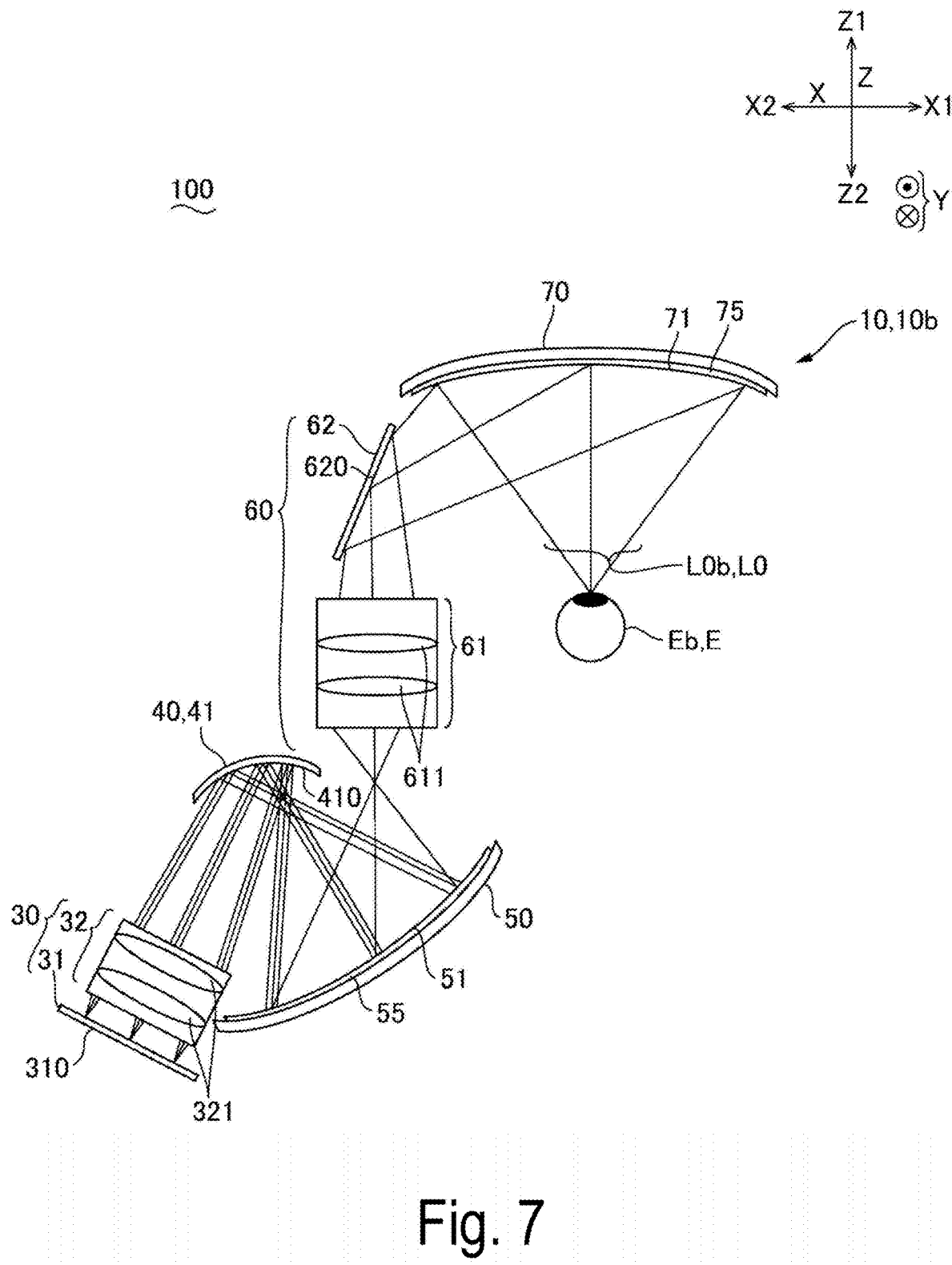
FIG. 7 is a schematic diagram illustrating one aspect of an optical system of a display device according to Exemplary Embodiment 2 of the disclosure.

FIG. 7 is a schematic diagram illustrating one aspect of an optical system 10 of a display device 100 according to Exemplary Embodiment 2 of the disclosure. Note that the basic configuration of Exemplary Embodiment 2 and Exemplary Embodiments 3, 4, and 5 described later is the same as the basic configuration of Exemplary Embodiment 1. Thus, common portions are illustrated with the same reference numerals, and detailed description of the common portions will be omitted.

As illustrated in FIG. 7, also in the optical system 10 of the display device 100 in Exemplary Embodiment 2, the image light projecting device 30 emits the image light L0 toward the first side Z1 in the first direction Z, similarly to Exemplary Embodiment 1. The image light L0 emitted from the image light projecting device 30 is incident on the reflective element 41 (first reflective element) of the first light-guiding system 40 from the second side Z2 in the first direction Z. The reflective element 41 emits the incident image light L0 toward the second side Z2 in the first direction Z. The image light L0 emitted from the reflective element 41 is incident on the first diffraction element 50 from the first side Z1 in the first direction Z. The first diffraction element 50 emits the incident image light L0 toward the first side Z1 in the first direction Z. The image light L0 emitted from the first diffraction element 50 is incident on the second diffraction element 70 from the second side Z2 in the first direction Z. The second diffraction element 70 emits the incident image light L0 toward the second side Z2 in the first direction Z. The image light L0 emitted from the second diffraction element 70 is incident on the eye E of the observer. Further, the second light-guiding system 60 is disposed in the optical path from the first diffraction element 50 to the second diffraction element 70. Therefore, the image light L0 emitted from the first diffraction element 50 toward the first side Z1 in the first direction Z is incident on the second diffraction element 70 via the second light-guiding system 60.

In Exemplary Embodiment 2, the reflection surface 410 of the reflective element 41 has a shape having a central portion recessed and curved with respect to a peripheral portion in the incident direction of the image light L0. Thus, the reflective element 41 has a function of condensing light, and thus the image light L0 projected from the image light projecting device 30 can be efficiently caused to be incident on the first diffraction element 50. Accordingly, even with fewer lenses 321 used in the projection optical system 32 of the image light projecting device 30 than the lenses 321 in Exemplary Embodiment 1, the image light L0 can be efficiently condensed toward the eye E of the observer. The other configuration is the same as the configuration in Exemplary Embodiment 1.

Even in the display device 100 having such a configuration, the reflective element 41 is disposed on the first side Z1 in the first direction Z with respect to the image light projecting device 30, and thus the image light projecting device 30 having a great mass can be disposed on the second side Z2 in the first direction Z, similarly to Exemplary Embodiment 1. In Exemplary Embodiment 2, the end portion of the image light projecting device 30 on the second side Z2 in the first direction Z is located closer to the second side Z2 in the first direction Z than the first diffraction element 50. Accordingly, the image light projecting device 30 having a relatively great mass is disposed on the second side Z2 in the first direction Z (rearward), and thus that the center of gravity of the display device 100 is located rearward. Thus, when the display device 100 is mounted on the head, mounting stability of the display device 100 can be enhanced; for example, the frame 90 is less likely to be tilted forward.

Exemplary Embodiment 3

Figure 8:
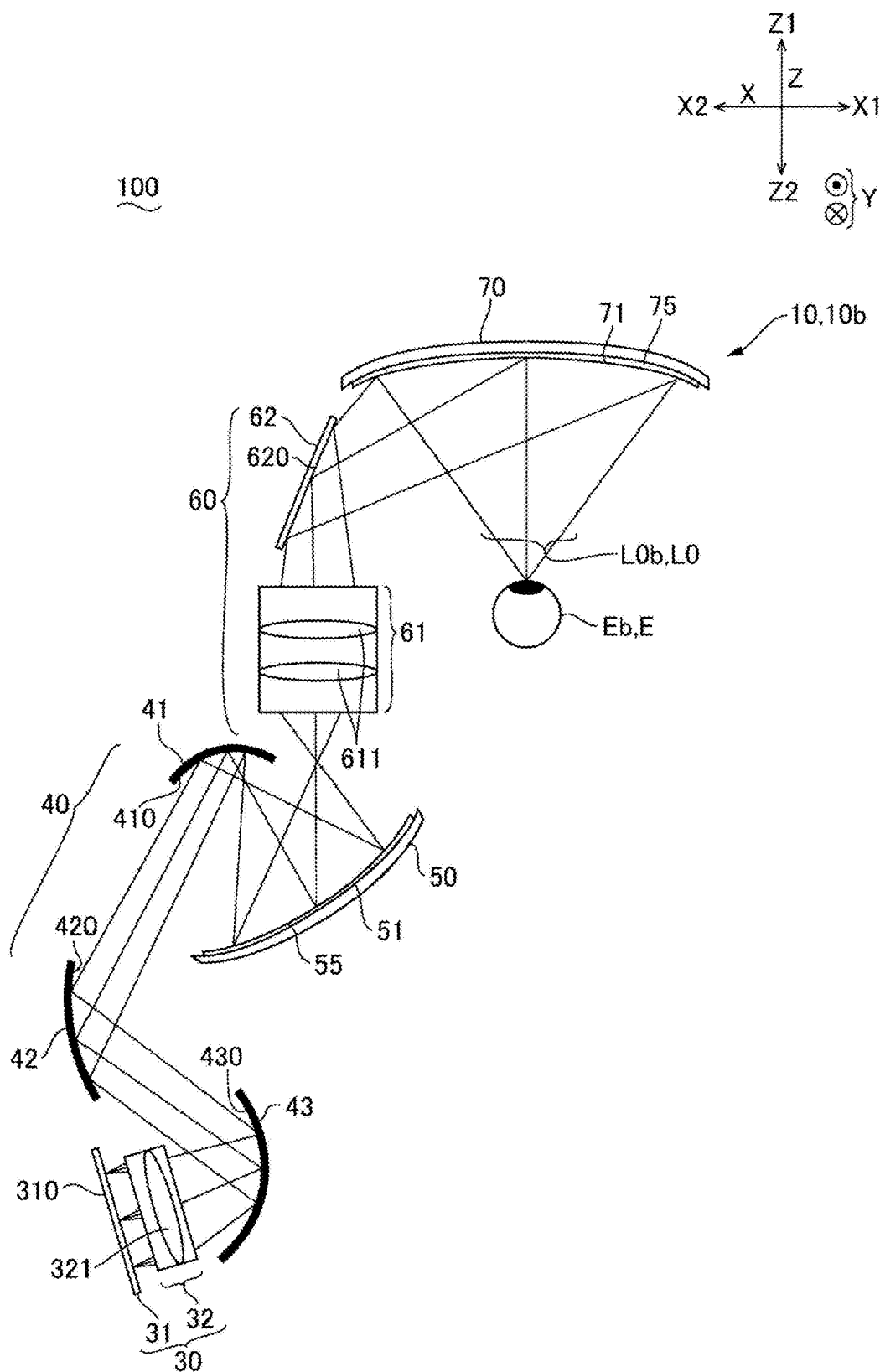
FIG. 8 is a schematic diagram illustrating one aspect of an optical system of a display device according to Exemplary Embodiment 3 of the disclosure.

FIG. 8 is a schematic diagram illustrating one aspect of an optical system 10 of a display device 100 according to Exemplary Embodiment 3 of the disclosure. As illustrated in FIG. 8, also in the optical system 10 of the display device 100 in Exemplary Embodiment 3, the image light projecting device 30 emits the image light L0 toward the first side Z1 in the first direction Z, similarly to Exemplary Embodiment 1. The image light L0 emitted from the image light projecting device 30 is incident on the reflective element 41 (first reflective element) of the first light-guiding system 40 from the second side Z2 in the first direction Z. The reflective element 41 emits the incident image light L0 toward the second side Z2 in the first direction Z. The image light L0 emitted from the reflective element 41 is incident on the first diffraction element 50 from the first side Z1 in the first direction Z. The first diffraction element 50 emits the incident image light L0 toward the first side Z1 in the first direction Z. The image light L0 emitted from the first diffraction element 50 is incident on the second diffraction element 70 from the second side Z2 in the first direction Z. The second diffraction element 70 emits the incident image light L0 toward the second side Z2 in the first direction Z. The image light L0 emitted from the second diffraction element 70 is incident on the eye E of the observer. Further, the second light-guiding system 60 is disposed in the optical path from the first diffraction element 50 to the second diffraction element 70. Therefore, the image light L0 emitted from the first diffraction element 50 toward the first side Z1 in the first direction Z is incident on the second diffraction element 70 via the second light-guiding system 60.

In Exemplary Embodiment 3, the first light-guiding system 40 includes a reflective element 42 (second reflective element) that causes the image light L0 emitted from the image light projecting device 30 to be incident on the reflective element 41 (first reflective element). The first light-guiding system 40 further includes a reflective element (third reflective element) that causes the image light L0 emitted from the image light projecting device 30 to be incident on the reflective element 42 (second reflective element).

Herein, the image light projecting device 30 emits the image light L0 to the direction inclined obliquely from the first side Z1 in the first direction Z toward the first side X1 in the second direction X. The reflective element 43 (third reflective element) corresponding to the configuration is located on the first side X1 in the second direction X to face the image light projecting device 30, and has a reflection surface 430 facing the second side X2 in the second direction X. Further, the reflective element 42 (second reflective element) is located in a position away from the reflective element 43 toward the first side Z1 in the first direction Z and the second side X2 in the second direction X, and has a reflection surface 420 facing the first side X1 in the second direction X. Therefore, the image light L0 emitted from the image light projecting device 30 is reflected by the reflective element 43 toward the first side Z1 in the first direction Z and the second side X2 in the second direction X, and then reflected by the reflective member 42 toward the first side Z1 in the first direction Z and the first side X1 in the second direction X and incident on the reflective element 41.

Therefore, the image light projecting device 30 is disposed on the second side Z2 in the first direction Z in a position away from the first diffraction element 50, similarly to Exemplary Embodiment 1. Accordingly, the image light projecting device 30 having a relatively great mass is disposed on the second side Z2 in the first direction Z (rearward), and thus the center of gravity of the display device 100 is located rearward. Thus, when the display device 100 is mounted on the head, mounting stability of the display device 100 can be enhanced; for example, the frame 90 is less likely to be tilted forward.

Further, the reflection surfaces 410, 420, and 430 of the respective reflective elements 41, 42, and 43 each have a shape having a central portion recessed and curved with respect to a peripheral portion in the incident direction of the image light L0. Thus, each of the reflective elements 41, 42, and 43 has a function of condensing light. Therefore, the reflective element 43 can effectively cause the image light L0 projected from the image light projecting device 30 to be incident on the reflective element 42. The reflective element 42 can efficiently cause the image light L0 emitted from the reflective element 43 to be incident on the reflective element 41. The reflective element 41 can efficiently cause the image light L0 emitted from the reflective element 42 to be incident on the first diffraction element 50. Accordingly, even with fewer lenses 321 used in the projection optical system 32 of the image light projecting device 30 than the lenses 321 in Exemplary Embodiment 2, the image light L0 can be efficiently condensed toward the eye E of the observer.

When the image light projecting device 30 and the reflective elements 41, 42, and 43 are installed on the frame 90 illustrated in FIG. 1, the image light projecting device 30 and the reflective elements 41, 42, and 43 can be disposed along the temple 92b. Therefore, a weight balance of the whole display device 100 including the frame 90 can be enhanced, and thus mounting stability of the display device 100 can be enhanced. The other configuration is the same as the configuration in Exemplary Embodiment 1.

Exemplary Embodiment 4

Figure 9:
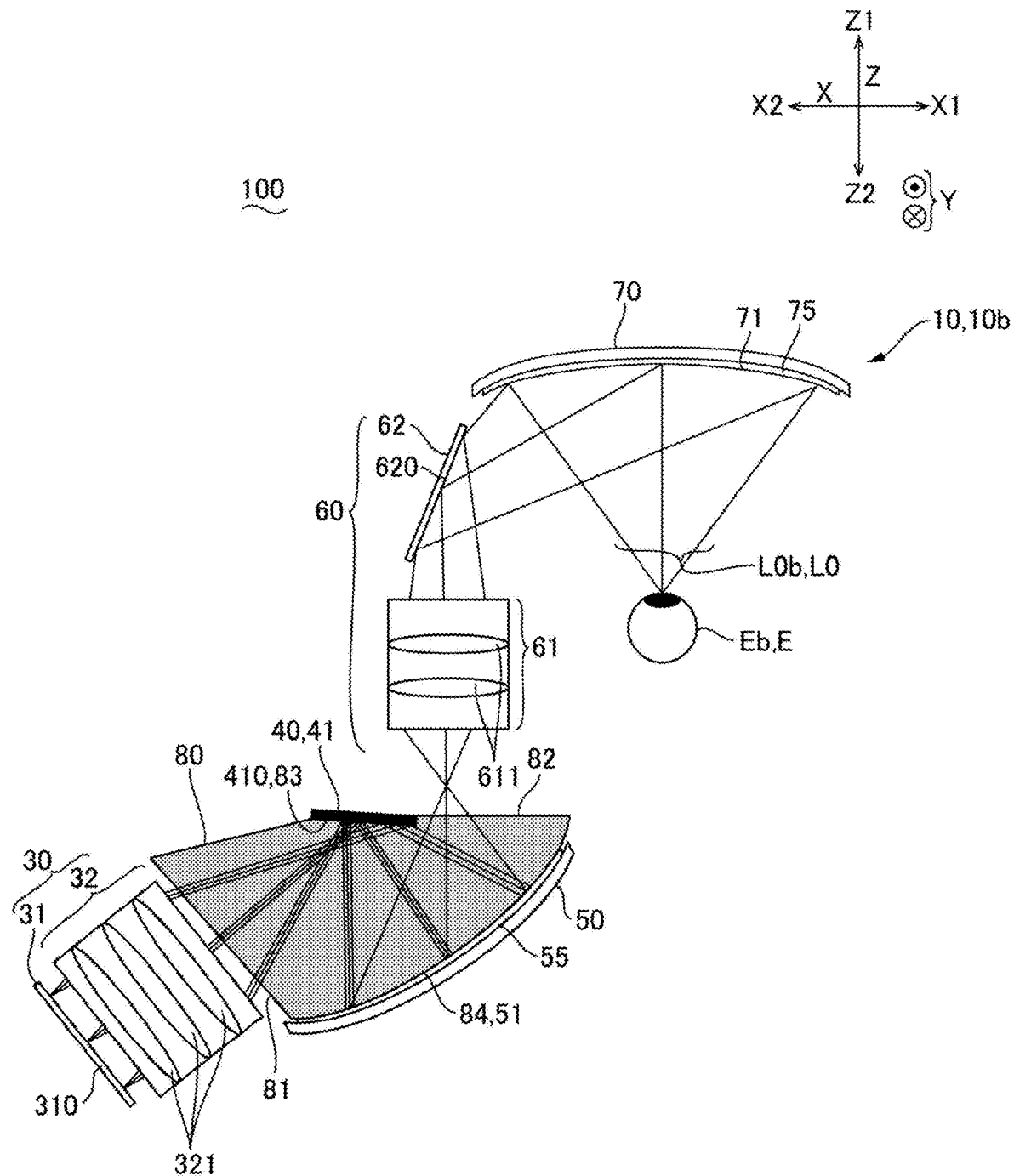
FIG. 9 is a schematic diagram illustrating one aspect of an optical system of a display device according to Exemplary Embodiment 4 of the disclosure.

FIG. 9 is a schematic diagram illustrating one aspect of an optical system 10 of a display device 100 according to Exemplary Embodiment 4 of the disclosure. FIG. 9 illustrates a light transmissive light-guiding member 80 in a gray region. As illustrated in FIG. 9, in the optical system 10 in Exemplary Embodiment 4, the first diffraction element 50 and the reflective element 41 (first reflective element) in the optical system 10 in Exemplary Embodiment 1 are fixed to any of a plurality of surfaces of the light transmissive light-guiding member 80. In Exemplary Embodiment 4, the light-guiding member 80 has an incident surface 81 on which the image light L0 from the image light projecting device 30 is incident, an emitting surface 82 that emits the image light L0 to the second light-guiding system 60, a surface 83 to which the reflection surface 410 of the reflective element 41 is bonded, and a curved surface 84 to which the incident surface 51 of the first diffraction element 50 is bonded.

Therefore, the reflective element 41 and the first diffraction element 50 are integrated via the light-guiding member 80. Accordingly, when the reflective element 41 and the first diffraction element 50 are installed on the frame 90 described with reference to FIG. 1, the reflective element 41 and the first diffraction element 50 integrated via the light-guiding member 80 can be handled. Thus, the display device 100 can be efficiently assembled, and a positional relationship between the reflective element 41 and the first diffraction element 50 can also have high accuracy.

Exemplary Embodiment 5

Figure 10:
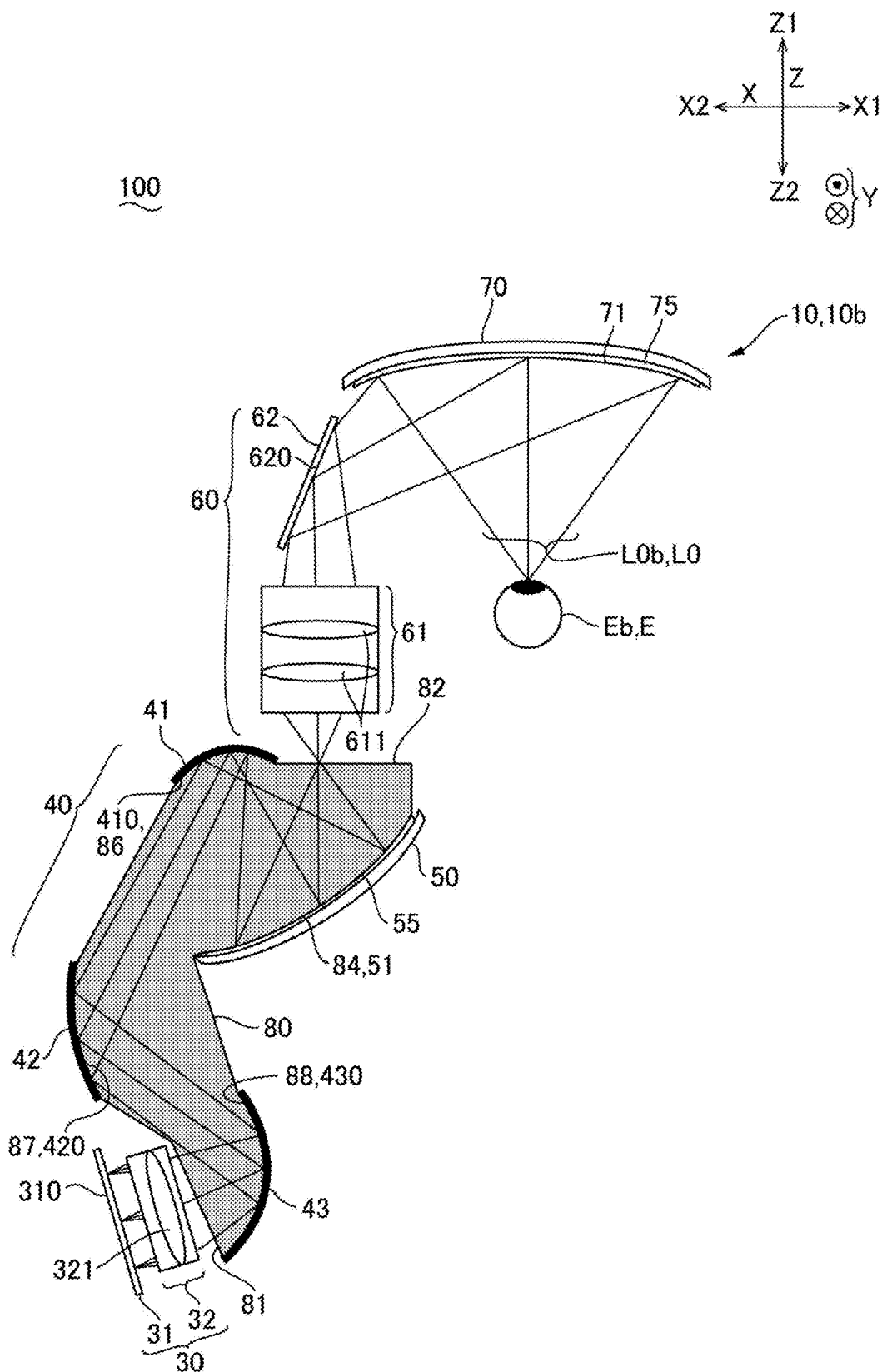
FIG. 10 is a schematic diagram illustrating one aspect of an optical system of a display device according to Exemplary Embodiment 5 of the disclosure.

FIG. 10 is a schematic diagram illustrating one aspect of an optical system 10 of a display device 100 according to Exemplary Embodiment 5 of the disclosure. FIG. 10 illustrates the light transmissive light-guiding member 80 in a gray region. As illustrated in FIG. 10, in the optical system 10 in Exemplary Embodiment 5, the first diffraction element 50 and the reflective element 41 (first reflective element) in the optical system 10 in Exemplary Embodiment 3 are fixed to any of the plurality of surfaces of the light transmissive light-guiding member 80. Therefore, the light-guiding member 80 has the incident surface 81 on which the image light L0 from the image light projecting device 30 is incident, the emitting surface 82 that emits the image light L0 to the second light-guiding system 60, a curved surface 86 to which the reflection surface 410 of the reflective element 41 is bonded, and the curved surface 84 to which the incident surface 51 of the first diffraction element 50 is bonded.

Also in Exemplary Embodiment 5, the reflective element 42 (second reflective element) and the reflective element 43 (third reflective element) are fixed to different surfaces of the light-guiding member 80. Therefore, the light-guiding member 80 further includes a curved surface 87 to which the reflection surface 420 of the reflective element 42 is bonded and a curved surface 88 to which the reflection surface 430 of the reflective element 43 is bonded.

Therefore, the reflective elements 41, 42, and 43 and the first diffraction element 50 are integrated via the light-guiding member 80. Accordingly, when the reflective elements 41, 42, and 43 and the first diffraction element 50 are installed on the frame 90 described with reference to FIG. 1, the reflective elements 41, 42, and 43 and the first diffraction element 50 integrated via the light-guiding member 80 can be handled. Thus, the display device 100 can be efficiently assembled, and a positional relationship between the reflective elements 41, 42, and 43 and the first diffraction element 50 is also enabled with high accuracy.

Other Configuration Related to Wavelength Compensation in Optical System 10

Figure 11:
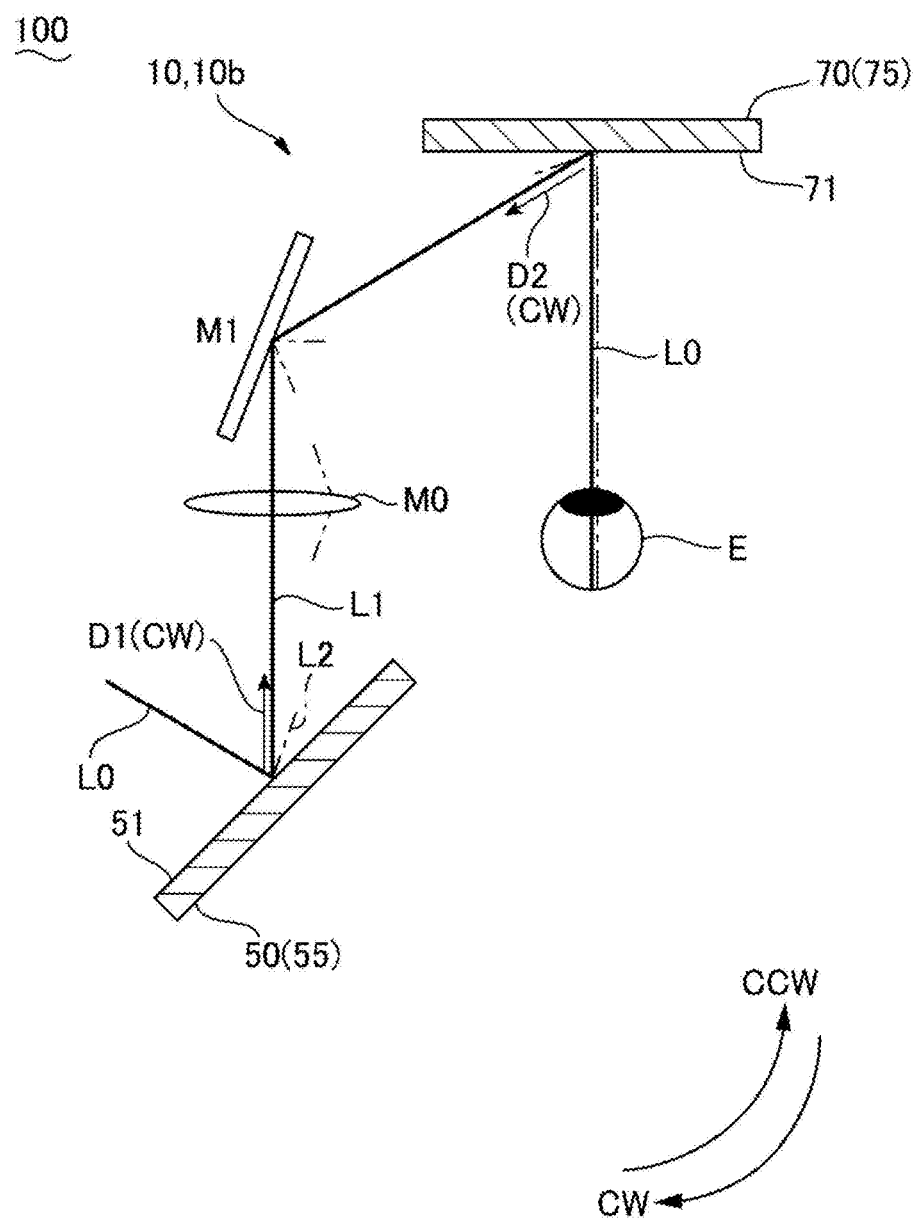
FIG. 11 is a schematic diagram of an optical path from the first diffraction element to the second diffraction element in the optical system in FIGS. 2 and 4.
Figure 12:
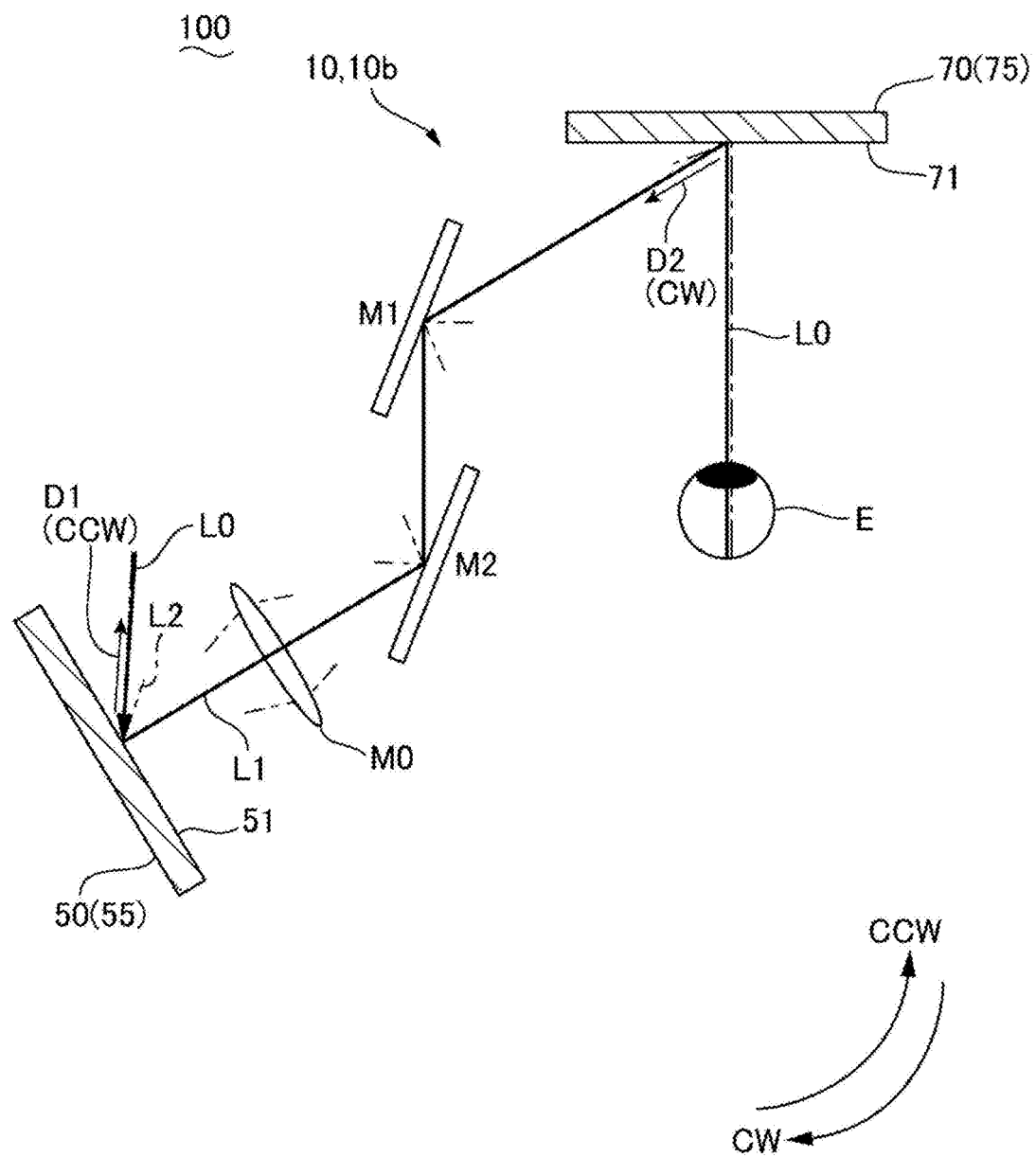
FIG. 12 is a schematic diagram of an optical path from the first diffraction element to the second diffraction element in the optical system according to a modified example of the disclosure.

With reference to FIGS. 11 and 12, while Exemplary Embodiments described above and a modified example of the disclosure will be described, a condition for wavelength compensation will be described. FIG. 11 is a schematic diagram of the optical path from the first diffraction element 50 to the second diffraction element 70 in the optical system 10 in FIGS. 2 and 4. FIG. 12 is a schematic diagram of the optical path from the first diffraction element 50 to the second diffraction element 70 in the optical system 10 according to a modified example of the disclosure.

FIGS. 11 and 12 do not illustrate the lens system 61 of the second light-guiding system 60 and illustrate the first diffraction element 50 and the second diffraction element 70 as planes to facilitate the understanding of the configuration between the first diffraction element 50 and the second diffraction element 70. Further, an intermediate image generating lens M0 illustrates generation of an intermediate image by the first diffraction element 50 and the like, and a mirror M1 illustrates a reflective member used in the second light-guiding system 60. Therefore, the reflective member 62 is illustrated by the mirror M1 in FIG. 11, and a mirror M2 is added to FIG. 12 in addition to the mirror M1.

Note that FIGS. 11 and 12 illustrate the light L2 (dot-and-dash line) on the long wavelength side with respect to a specific wavelength. Also in FIGS. 11 and 12, a direction having the highest diffraction efficiency when light is incident from a normal direction of the incident surface 51 of the first diffraction element 50 is a first diffraction direction D1, and a direction having the highest diffraction efficiency when light is incident from a normal direction of the incident surface 71 of the second diffraction element 70 is a second diffraction direction D2.

In the optical system 10 illustrated in FIG. 11, the second diffraction element 70 and the first diffraction element 50 are disposed such that the direction of the second diffraction direction D2 with respect to the normal direction of the incident surface 71 of the second diffraction element 70 is a CW direction, while the direction of the first diffraction direction D1 with respect to the normal direction of the incident surface 51 of the first diffraction element 50 is also the CW direction.

In the optical system 10 illustrated in FIG. 12, the second diffraction element 70 and the first diffraction element 50 are disposed such that the direction of the second diffraction direction D2 with respect to the normal direction of the incident surface 71 of the second diffraction element 70 is the CW direction, while the direction of the first diffraction direction D1 with respect to the normal direction of the incident surface 51 of the first diffraction element 50 is a CCW direction.

In other words, the first diffraction element 50 and the second diffraction element 70 are disposed differently depending on whether a sum of the number of reflections and the number of generations of an intermediate image is even or odd between the first diffraction element 50 and the second diffraction element 70.

Specifically, when a sum of the number of reflections and the number of generations of an intermediate image is even as in the optical system 10 illustrated in FIG. 11, the first diffraction element 50 and the second diffraction element 70 are disposed such that the direction of the second diffraction direction D2 with respect to the normal direction of the incident surface 71 of the second diffraction element 70 and the direction of the first diffraction direction D1 with respect to the normal direction of the incident surface 51 of the first diffraction element 50 are identical to each other (CW direction) when viewed from a normal direction (planar direction of FIG. 11) of a virtual plane including a normal line of the incident surface 71 of the second diffraction element 70 and a normal line of the incident surface 51 of the first diffraction element 50.

In contrast, when a sum of the number of reflections and the number of generations of an intermediate image is odd as in the optical system 10 illustrated in FIG. 12, the first diffraction element 50 and the second diffraction element 70 are disposed such that the direction of the second diffraction direction D2 and the direction of the first diffraction direction D1 are opposite to each other (CW direction and CCW direction) seen from a normal direction (planar direction of FIG. 12) of the above-mentioned virtual plane.

In this way, the image light L0 having a spectral width is deflected and dispersed at each wavelength by the first diffraction element 50, and then condensed at each wavelength by the second diffraction element 70 and incident as substantially parallel light on a pupil.

Note that the modified example illustrated in FIG. 12 illustrates one aspect in which the mirror M2 between the second diffraction element 70 and the first diffraction element 50 is added, but addition or deletion of an optical element is not limited to this. For example, a lens or a mirror may be further added, or a mirror may be deleted. Also in this case, the direction of the second diffraction direction D2 with respect to the normal direction of the incident surface 71 of the second diffraction element 70 and the direction of the first diffraction direction D1 with respect to the normal direction of the incident surface 51 of the first diffraction element 50 may be configured in the same manner as the above-mentioned example, depending on whether a sum of the number of reflections and the number of generations of an intermediate image is even or odd between the first diffraction element 50 and the second diffraction element 70.

What is claimed is:

1. A display device, comprising:
an image light projecting device configured to project image light;
a first light-guiding system including a first reflective element disposed on a first side in a first direction with respect to the image light projecting device, the first light-guiding system being configured to emit the image light projected from the image light projecting device toward a second side in the first direction by the first reflective element;
a first diffraction element having a reflectivity, and configured to emit the image light emitted from the first reflective element toward the first side in the first direction; and
a second diffraction element having a reflectivity, and configured to emit the image light emitted from the first diffraction element toward the second side in the first direction,
wherein
the second diffraction element is disposed closer to a first side in a second direction intersecting the first direction than the first diffraction element, and a second light-guiding system configured to guide the image light emitted from the first diffraction element toward the second diffraction element is provided in an optical path from the first diffraction element to the second diffraction element.

2. The display device according to claim 1, wherein
the first direction is a front-rear direction of an observer,
the first side in the first direction is a front side in the front-rear direction,
the second side in the first direction is a rear side in the front-rear direction,
the display device further comprises a frame configured to hold the image light projecting device, the first light-guiding system, the first diffraction element, and the second diffraction element, and
when the frame is mounted on a head of the observer, the second diffraction element is disposed in front of an eye of the observer.

3. The display device according to claim 1, wherein the image light projecting device projects the image light toward the first side in the first direction.

4. The display device according to claim 1, wherein
the second light-guiding system includes:
a lens system configured to allow the image light emitted from the first diffraction element to be incident on; and
a reflective member configured to emit, toward the first side in the second direction, the image light emitted from the lens system to the first side in the first direction.

5. The display device according to claim 1, wherein the image light projecting device is disposed closer to the second side in the first direction than the first diffraction element.

6. The display device according to claim 1, wherein a reflection surface of the first reflective element is a recessed curved surface being recessed in a central portion with respect to a peripheral portion.

7. The display device according to claim 1, wherein the first light-guiding system includes a second reflective element configured to direct the image light emitted from the image light projecting device toward the first reflective element.

8. The display device according to claim 7, wherein a reflection surface of the second reflective element is a recessed curved surface being recessed in a central portion with respect to a peripheral portion.

9. The display device according to claim 1, wherein the first diffraction element and the first reflective element are fixed to any of a plurality of surfaces of a light transmissive light-guiding member.

10. The display device according to claim 1, wherein each of an incident surface of the first diffraction element and an incident surface of the second diffraction element is a recessed curved surface being recessed in a central portion with respect to a peripheral portion.

11. The display device according to claim 1, wherein each of the first diffraction element and the second diffraction element is a reflective volume holographic element.

12. The display device according to claim 1, wherein the image light projecting device includes:

an image light generating device configured to generate the image light; and
a projection optical system configured to project the image light generated by the image light generating device.

13. The display device according to claim 12, wherein the image light generating device includes an organic electroluminescent display element.

14. The display device according to claim 12, wherein
the image light generating device includes:
an illumination light source; and
a liquid crystal display element configured to modulate illumination light emitted from the illumination light source.

15. A display device, comprising:
an image light projecting device configured to project image light;
a first light-guiding system including a first reflective element disposed on a first side in a first direction with respect to the image light projecting device, the first light-guiding system being configured to emit the image light projected from the image light projecting device toward a second side in the first direction by the first reflective element;
a first diffraction element having a reflectivity, and configured to emit the image light emitted from the first reflective element toward the first side in the first direction; and
a second diffraction element having a reflectivity, and configured to emit the image light emitted from the first diffraction element toward the second side in the first direction, wherein
each of the first diffraction element and the second diffraction element is a reflective volume holographic element.

16. A display device, comprising:
an image light projecting device configured to project image light;
a first light-guiding system including a first reflective element disposed on a first side in a first direction with respect to the image light projecting device, the first light-guiding system being configured to emit the image light projected from the image light projecting device toward a second side in the first direction by the first reflective element;
a first diffraction element having a reflectivity, and configured to emit the image light emitted from the first reflective element toward the first side in the first direction; and
a second diffraction element having a reflectivity, and configured to emit the image light emitted from the first diffraction element toward the second side in the first direction, wherein
the image light projecting device includes:
an image light generating device configured to generate the image light; and
a projection optical system configured to project the image light generated by the image light generating device.

* * * * *